April 12, 1960            O. EMELE            2,932,399

FILTER PRESS MECHANISM

Filed March 27, 1956            3 Sheets-Sheet 1

INVENTOR
Otto Emele
BY Alex. E. MacRae
ATTORNEY

April 12, 1960     O. EMELE     2,932,399

FILTER PRESS MECHANISM

Filed March 27, 1956     3 Sheets-Sheet 2

Inventor:
Otto Emele
By Alex. E. MacRae
Attorney.

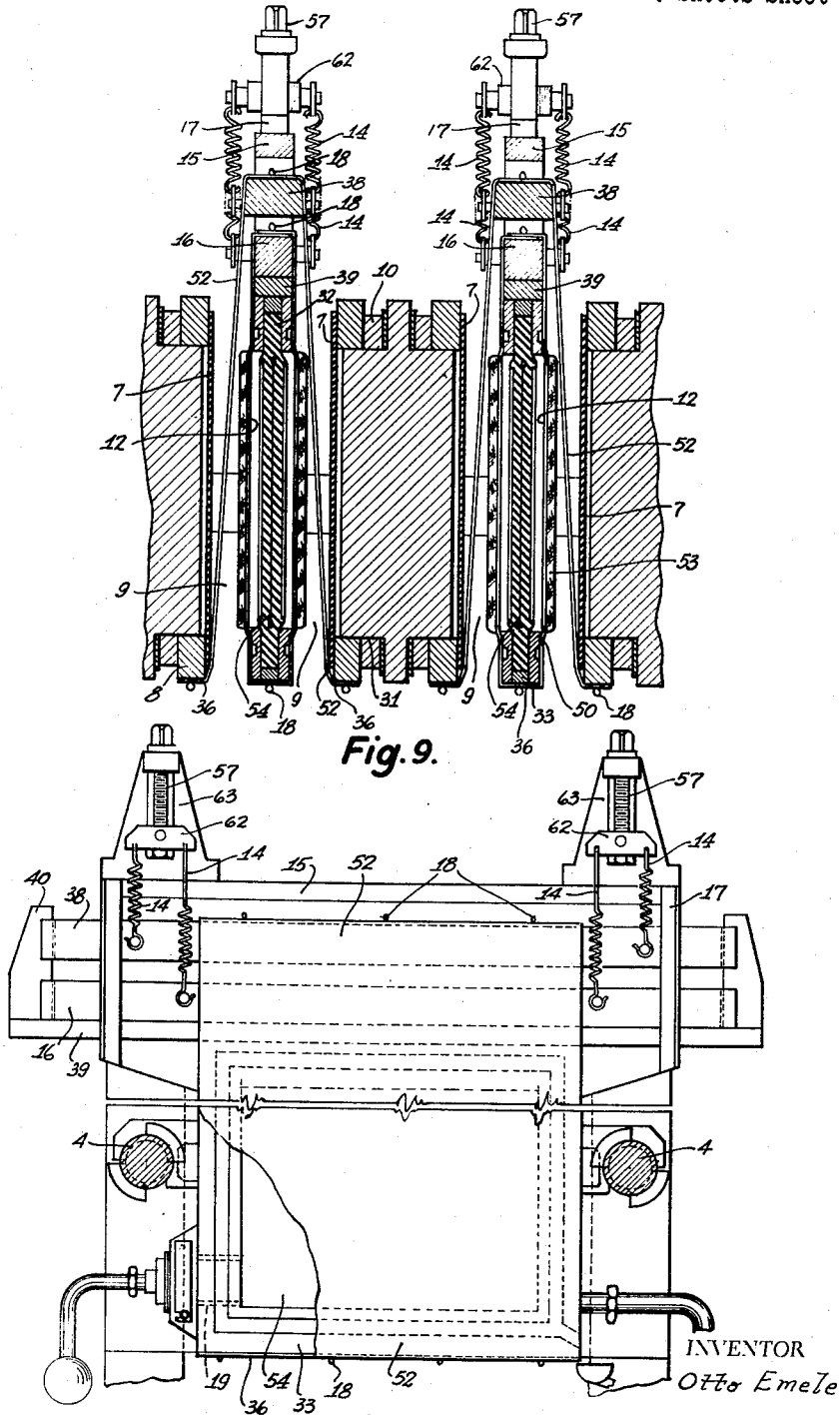

United States Patent Office 2,932,399
Patented Apr. 12, 1960

2,932,399

FILTER PRESS MECHANISM

Otto Emele, Kressbronn am Bodensee, Germany

Application March 27, 1956, Serial No. 574,349

5 Claims. (Cl. 210—225)

This invention relates to filter presses and more particularly to filter cake releasing mechanism therefor.

In filter presses having a plurality of axially aligned parallel pressure plates, pressure compartments are formed between adjacent ones of such pressure plates. The walls of such compartments are usually formed by flexible wall or partition members which may comprise flexible membranes or filter cloths. Each compartment is arranged to receive moist material to be filtered or desiccated under pressure by the pressure plates. After the pressing step, a filter cake remains in the pressure compartment and must be discharged therefrom. The discharge of such filter cake is frequently hindered by reason of its adherence to the flexible membrane or filter cloth.

It is an object of the present invention to provide filter cake releasing mechanism for filter presses which is simple in structure, capable of convenient installation, and effective in operation.

Figure 1:
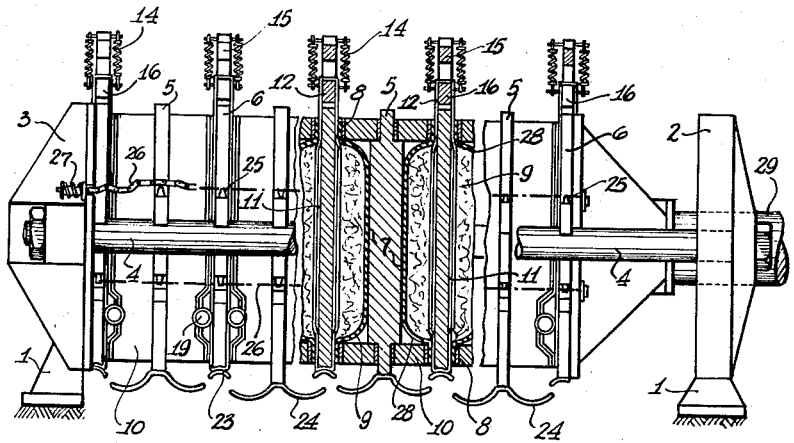
Figures 2, 3:
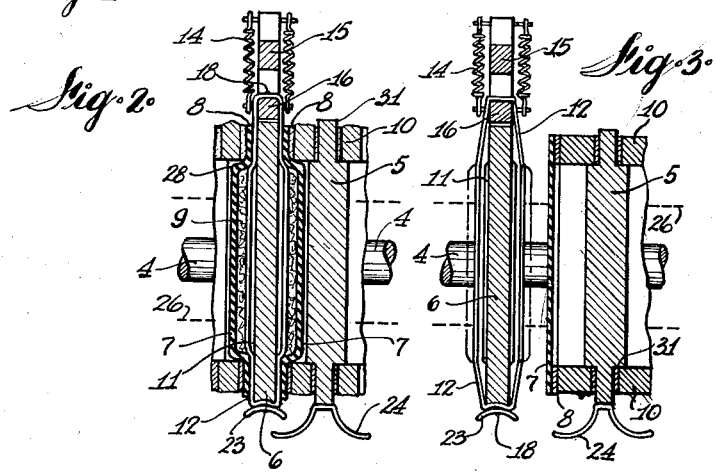
Figures 4, 5:
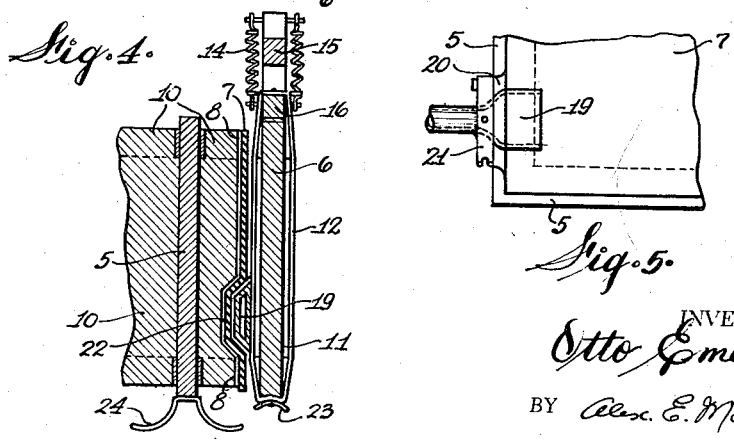
Figure 6:
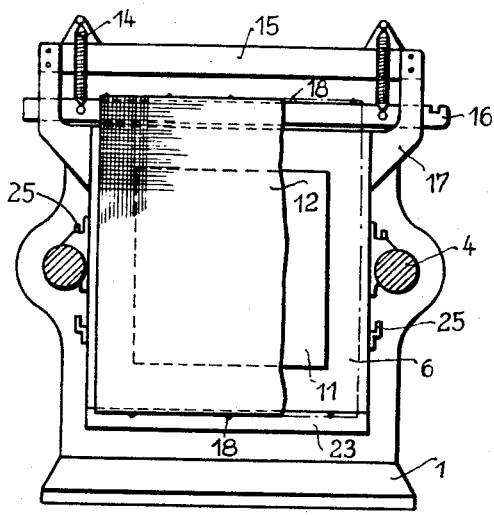
Figure 8:
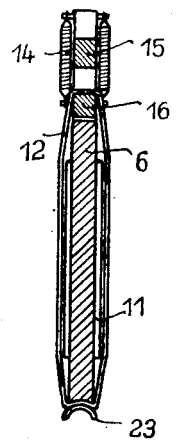
Figure 7:
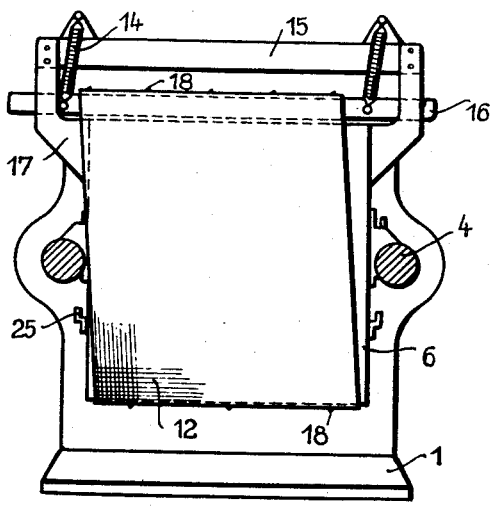

The invention will be described with reference to the accompanying drawings, in which:

Figure 1 is a side elevation, partly in section, of a filter press incorporating the present invention, Figure 2 is an enlarged sectional side elevation of a portion of the filter press in one operating position thereof, Figure 3 is an enlarged sectional side elevation of the portion of filter press shown in Figure 2 in another operating position thereof, Figure 4 is an enlarged sectional side elevation of another portion of the filter press, Figure 5 is a partial end elevation of the filter press portion shown in Figure 4, Figure 6 is an enlarged front elevation of a pressure plate with associated filter cake releasing mechanism, Figure 7 is a view similar to Figure 6 but showing the mechanism in another position, Figure 8 is a sectional side elevation of the parts shown in Figure 6, Figure 9 is a partial sectional side elevation of a modified form of filter press incorporating the present invention, and Figure 10 is a section on line V—V of Figure 9.

The filter press shown in Figures 1 to 8 comprises stands 1 having end supports 2 and 3 mounted thereon and a pair of armature shafts 4 joining the end supports. Slidably carried on the armature shafts 4 between the end supports 2 and 3 are a plurality of four-cornered or round pressure plates 5 and 6 in alternate relation to each other. Between each pressure plate 5 and the adjacent pressure plate 6 is a flexible, elastic, impermeable membrane 7 mounted in a rigid frame 8, which is retained under resilient pressure between pressure plates 5 and 6 by means of elastic spacers 10 between frame 8 and pressure plate 5. Such spacers may be formed of foam rubber or the like and rest in recesses 31 provided on the circumference of pressure plates 5. Recesses 31 also serve as guides for the frames 8. Membrane 7 may be formed of rubber or the like.

Each membrane 7 forms between it and the adjacent face of plate 6 a pressure compartment 9.

Presusre plates 6 are each furnished with small plate-like elevations 11 on each side thereof covered with a filter cloth 12. Elevations 11 effect a more favorable lateral pressure compartment sealing and result in a more rapid desiccating procedure.

As shown in the drawings, pressure compartments 9 are preferably arranged in pairs; for example, each pressure compartment 9 is closed by the pressure plate 6 situated between them. In the other direction, each pressure compartment 9 is bounded by a pressure plate 5 against which the membrane 7 is in contact. At the edge or circumference each pressure compartment is tightly closed by reason of the fact that frame 8 is pressed by the elastic spacers 10 against pressure plate 6. The edge portions of membrane 7 and filter cloth 12 are also situated between frame 8 and pressure plate 6.

To ensure that the pressure will be uniform in all the pressure compartments 9 of the stack of pressure plates, the spacers 10 may be made progressively weaker in the direction from support 2 to support 3, according to the frictional resistance of pressure plates 5 and 6 in their sliding movement along shafts 4.

A filling mouthpiece 19 is mounted between each pressure plate 6 and adjoining frame 8. This mouthpiece is provided with a slit-shaped exit and is retained by a clamping bracket 21 or the like, as shown in Figures 4 and 5. The filling mouthpiece 19 is mounted in a depression 22 in plate 5. At the lower ends of pressure paltes 6 are deflection surfaces 23, and somewhat below them drain troughs 24 on pressure plates 5, whereby during the filling and pressure steps they approach each other for the purpose of deflecting the filtrate, whereas when the pressure plates 5 and 6 are drawn apart a free passage therebetween is possible to allow the filter or press cake to fall out between plates 5 and 6, as will be clear from Figure 5.

In order to insure uniform distances between pressure plates 5 and 6 when the set of plates is fully drawn apart (emptying position), roller chains 26 or the like are provided. Each chain 26 has one end connected to the end pressure plate 6 adjacent support 2 and its other end connected to the end pressure plate 6 adjacent support 3. In the latter end connection, a compression spring 27 is interposed. The chain is connected to each pressure plate 5 and 6 by means of hooks 25.

The plates 5 and 6 are compressed and retracted by means of a piston 29.

The filter cake releasing mechanism comprises a stationary bar 15 mounted in fixed supports 17 in opposed spaced relation to the upper edge of each plate 6. Freely suspended from each bar 15 by means of springs 14 is a bar 16 which is thus swingable with respect to the fixed bar and its supports. Each bar 16, in its at rest position, is also in opposed spaced relation to the upper edge of a plate 6 and is parallel and substantially coplanar therewith. The edge portion of the filter cloth 12 on each side of the underlying plate 6 is fixed to bar 16 by means of pins 18.

In operation, the moist material to be treated is forced under pressure through filling mouthpieces 19 into all the pressure compartments 9. As this occurs, membranes 7 bulge outwardly to receive the material. Consequently, edge zones 28 of wedge-shaped cross section are formed in which the material is not as thick as in the rest of the compartment. At the same time an initial desiccating takes place through filter cloths 12. This is particularly strong in the edge zones. After filling is complete, the set of pressure plates is forced together by means of the piston 29. Thereby the layers of material, formed by displacement of the material towards the edge zones 28, and now of practically equal layer thicknesses in all zones of the pressure compartments 9, are fully desiccated. After the pressing step, the set of pressure plates is drawn apart to the emptying position of Figure 3 by the piston 29.

The filter cakes adhere to the filter cloths 12 and are now freed therefrom by single or repeated lateral back and forth movements of the bars 16. Such movement of each bar 16 imparts a like movement to the attached filter cloth 12 which distorts the filter cloth laterally in substantially its own plane. Thus the filter cake is freed therefrom and it is free to drop out from between the pressure plates.

Referring to Figures 9 and 10, a modified form of filter pressure is illustrated wherein, instead of the pressure plates 6, pressure plates 54 each comprising an inflatable bladder, are employed. Each bladder is clamped with its edge 32 in a frame 33 of U-shaped cross section. In this case, a second filter cloth 52 is interposed between filter cloth 12 and membrane 7, the pressure compartment 9 being formed between filter cloths 12 and 52.

The edge portions of filter cloths 12 are fixed to movable bar 16 and the edge portions of filter cloths 52 are fixed to a movable bar 38. Bars 16, 38 are joined at their ends by stays 40 connected by a displacing beam 39. Each bar 16, 38 is freely suspended by means of helical springs 14 from fixed blocks 62 mounted on screws 57 carried by fixed brackets 63. As shown, the brackets 63 are mounted on the fixed bar 15 carried by the supports 17. It will be apparent that the tension of springs 14 may be adjusted by turning the screws 57 to adjust the position of the suspension blocks 62 thereon. Filter cloth 12 encloses bladder 54 and bladder frames 33 on both sides and is fastened at the bottom to frame 33. The second filter cloth 52 which covers membrane 7 is fastened at the bottom at 36 to the frame 8.

In this modification, compression of the pressure compartments is augmented by inflating the bladders 54. On completion of the pressing step, the compartments are placed in the emptying position shown in Figure 9, and the press cakes, indicated at 53, loosened by moving bars 16 and 38 and the attached filter cloths 12, 52.

I claim:

1. In a filter press having at least one pair of axially aligned parallel pressure plates, and means including at least one filter cloth forming a pressure compartment between said pressure plates, said pressure compartment being arranged to receive material to be filtered, mechanism for separating filter cake from said filter cloth comprising a fixed support, a bar, springs resiliently suspending said bar from said support for swinging movement with respect thereto, said filter cloth having an edge portion mounted on said bar for movement therewith, and an opposite edge portion fixed to one of said pressure plates.

2. In a filter press having at least one pair of axially aligned parallel pressure plates and means including at least one filter cloth forming a pressure compartment between said pressure plates, said pressure compartment being arranged to receive material to be filtered, mechanism for separating filter cake from said filter cloth comprising a fixed support, a bar, springs resiliently suspending said bar from said support for swinging movement with respect thereto, said bar in its at rest position being located adjacent the edge of one of said pressure plates and in parallel relation thereto, said filter cloth having an edge portion mounted on said bar for movement therewith and an opposite edge portion fixed to one of said pressure plates.

3. In a filter press having a plurality of axially aligned parallel pressure plates and means including at least one filter cloth forming a pressure compartment between each said pressure plate and the adjacent one of said pressure plates, said pressure compartment being arranged to receive material to be filtered, mechanism for separating filter cake from each said filter cloth comprising a fixed support, a bar, springs resiliently suspending said bar from said support for swinging movement with respect thereto, said bar being located in opposed relation to one edge of one of said pressure plates and in substantially coplanar relation therewith, said filter cloths from two of said compartments each having an edge portion fixed to said bar for movement therewith and an opposite edge portion fixed to one of said pressure plates.

4. In a filter press having a plurality of axially aligned parallel pressure plates and means including a flexible membrane and a filter cloth forming a pressure compartment between each said pressure plate and the adjacent one of said pressure plates, said pressure compartment being arranged to receive material to be filtered, mechanism for separating filter cake from said filter cloth comprising a fixed support, a bar having a location in opposed relation to one edge of one of said pressure plates and in substantially coplanar relation therewith, springs resiliently suspending said bar from said support in said location for swinging movement with respect thereto, said filter cloth having one edge portion fixed to said one pressure plate and its other edge portion fixed to said bar for movement therewith.

5. In a filter press having a plurality of axially aligned parallel pressure plates, and a pair of filter cloths between each said pressure plate and the adjacent one of said pressure plates, each said pair of filter cloths forming a pressure compartment therebetween for reception of material to be filtered, mechanism for separating filter cake from said filter cloths comprising a fixed support, a pair of bars each resiliently suspended from said support for swinging movement with respect thereto, each said bar being in opposed relation to one edge of one of said pressure plates and in substantially parallel relation therewith, one of said filter cloths from each of two adjacent pressure compartments having an edge portion fixed to one of said bars for movement therewith and an opposite edge portion fixed to one of said pressure plates, and the other of said filter cloths from each of said two adjacent pressure compartments having an edge portion fixed to the other of said bars for movement therewith and an opposite edge portion fixed to one of said pressure plates.

References Cited in the file of this patent

UNITED STATES PATENTS

| 297,042 | Warden | Apr. 15, 1884 |
| 402,455 | Johnson | Apr. 30, 1889 |
| 549,896 | Bushnell | Nov. 19, 1895 |
| 699,052 | Wilson | Apr. 29, 1902 |
| 1,720,211 | Eddison | July 9, 1929 |
| 2,006,131 | Durant | June 25, 1935 |
| 2,512,365 | Muller | June 20, 1950 |
| 2,705,016 | Saar | Mar. 29, 1955 |

FOREIGN PATENTS

| 123,589 | Great Britain | Feb. 27, 1919 |
| 162,848 | Australia | May 6, 1954 |